(12) United States Patent
Miller et al.

(10) Patent No.: US 10,371,096 B2
(45) Date of Patent: Aug. 6, 2019

(54) GAS TURBINE ENGINE FAN

(71) Applicant: General Electric Company, Schenectady, NY (US)

(72) Inventors: Brandon Wayne Miller, Liberty Township, OH (US); Daniel Alan Niergarth, Cincinnati, OH (US); Darek Tomasz Zatorski, Fort Wright, KY (US)

(73) Assignee: General Electric Company, Schenectady, NY (US)

( * ) Notice: Subject to any disclaimer, the term of this patent is extended or adjusted under 35 U.S.C. 154(b) by 575 days.

(21) Appl. No.: 14/943,055

(22) Filed: Nov. 17, 2015

(65) Prior Publication Data

US 2017/0138306 A1    May 18, 2017

(51) Int. Cl.
*F01D 7/00* (2006.01)
*F02C 3/04* (2006.01)
(Continued)

(52) U.S. Cl.
CPC ............... *F02K 3/06* (2013.01); *F01D 7/00* (2013.01); *F01D 25/16* (2013.01); *F02C 3/04* (2013.01);
(Continued)

(58) Field of Classification Search
CPC . F02K 3/06; F02K 3/065; F01D 25/16; F01D 7/00; F02C 7/06; F02C 7/36;
(Continued)

(56) References Cited

U.S. PATENT DOCUMENTS 2,419,787 A    4/1947   Muffly
2,594,160 A    4/1952   Hansson
(Continued)

FOREIGN PATENT DOCUMENTS

EP    0 203 881 A1    12/1986
JP    2007-100928 A    4/2007
(Continued)

OTHER PUBLICATIONS

Takashi Nishikawa, et al. "Technical Trend of Aircraft Bearings", NTN Technical Review No. 82, p. 083-087, Oct. 2014. Obtained from <http://www.ntnglobal.com/en/products/review/pdf/NTN_TR82_en_083_087p.pdf> on Jan. 31, 2018.*
(Continued)

*Primary Examiner* — Alain Chau
(74) *Attorney, Agent, or Firm* — Dority & Manning, P.A.

(57) ABSTRACT

A gas turbine engine includes a core turbine engine and a fan mechanically coupled to the core turbine engine. The fan includes a plurality of fan blades, each fan blade defining a base and an inner end along a radial direction of the gas turbine engine. The fan also includes a hub covering the base of each of the plurality of fan blades. Further, the fan includes one or more bearings for supporting rotation of the plurality of fan blades. The one or more bearings define a fan bearing radius along a radial direction of the gas turbine engine. Similarly, the hub defines a hub radius along the radial direction of the gas turbine engine. The ratio of the hub radius to the fan bearing radius is less than about three, providing for desired packaging of the various components within the fan of the gas turbine engine.

16 Claims, 2 Drawing Sheets

(51) Int. Cl.
*F02C 7/04* (2006.01)
*F02C 7/06* (2006.01)
*F02C 7/36* (2006.01)
*F02K 3/06* (2006.01)
*F01D 25/16* (2006.01)
*F04D 29/32* (2006.01)
*F04D 29/36* (2006.01)
*F04D 29/059* (2006.01)

(52) U.S. Cl.
CPC .............. *F02C 7/04* (2013.01); *F02C 7/06* (2013.01); *F02C 7/36* (2013.01); *F04D 29/059* (2013.01); *F04D 29/323* (2013.01); *F04D 29/362* (2013.01); *F05B 2220/302* (2013.01); *F05B 2240/52* (2013.01); *F05D 2240/52* (2013.01); *F05D 2260/40311* (2013.01); *F05D 2260/70* (2013.01); *Y02T 50/673* (2013.01)

(58) Field of Classification Search
CPC ........ F02C 7/04; F02C 3/107; F05D 2240/52; B64C 11/00; B64C 11/02; B64C 11/06; F05B 2240/52; F04D 29/051; F04D 29/059
See application file for complete search history.

(56) References Cited

U.S. PATENT DOCUMENTS

| | | | | |
|---|---|---|---|---|
| 3,687,569 A * | 8/1972 | Klompas | ............ | F01D 7/00 415/140 |
| 3,893,789 A * | 7/1975 | Andrews | ............ | F01D 7/00 415/129 |
| 3,922,852 A * | 12/1975 | Drabek | ............ | F01D 7/00 60/226.1 |
| 4,887,424 A | 12/1989 | Geidel et al. | | |
| 5,028,207 A | 7/1991 | Rohra et al. | | |
| 5,584,586 A * | 12/1996 | Casarcia | ............ | C21D 10/005 384/492 |
| 7,840,301 B2 * | 11/2010 | Staroselsky | ............ | F16H 55/08 30/144 |
| 8,104,972 B2 | 1/2012 | Maguire | | |
| 8,834,095 B2 | 9/2014 | Davis | | |
| 8,869,504 B1 * | 10/2014 | Schwarz | ............ | F02K 1/09 60/226.1 |
| 9,797,407 B2 * | 10/2017 | Burghardt | ............ | F01D 25/16 |
| 10,094,278 B2 * | 10/2018 | Sheridan | ............ | F02C 3/06 |
| 10,190,496 B2 * | 1/2019 | Schwarz | ............ | F01D 25/16 |
| 2014/0119908 A1 | 5/2014 | Chrabascz et al. | | |
| 2014/0283500 A1* | 9/2014 | Sabnis | ............ | F02C 3/08 60/226.1 |
| 2015/0016994 A1 | 1/2015 | Burghardt | | |

FOREIGN PATENT DOCUMENTS

| | | |
|---|---|---|
| JP | 2013-079680 A | 5/2013 |
| WO | 2015/047489 A1 | 4/2015 |
| WO | 2015/048464 A1 | 4/2015 |

OTHER PUBLICATIONS

"Pratt & Whitney Canada PW600" (Aug. 1 2012). In Wikipedia, The Free Encyclopedia. Retrieved Feb. 20, 2017 from waybackmachine.com https://web.archive.org/web/20120801044400/https://en.wikipedia.org/wiki/Pratt_%26_Whitney_Canada_PW600.*

Extended European Search Report and Opinion issued in connection with corresponding EP Application No. 16199144.3 dated Jul. 21, 2017.

Office Action issued in connection with corresponding CA Application No. 2948264 dated Oct. 2, 2017.

First Office Action and Search issued in connection with corresponding CN Application No. 201611012064.9 dated Mar. 5, 2018.

* cited by examiner

US 10,371,096 B2

GAS TURBINE ENGINE FAN

FIELD OF THE INVENTION

The present subject matter relates generally to a fan for a gas turbine engine.

BACKGROUND OF THE INVENTION

A gas turbine engine generally includes a fan and a core arranged in flow communication with one another. The core of the gas turbine engine generally includes, in serial flow order, a compressor section, a combustion section, a turbine section, and an exhaust section. With multi-shaft gas turbine engines, the compressor section can include a high pressure compressor (HP compressor) and a low pressure compressor (LP compressor), and the turbine section can similarly include a high pressure turbine (HP turbine) and a low pressure turbine (LP turbine). With such a configuration, the HP compressor is coupled with the HP turbine via a high pressure shaft (HP shaft), and the LP compressor is coupled with the LP turbine via a low pressure shaft (LP shaft).

In operation, at least a portion of air over the fan is provided to an inlet of the core. Such portion of the air is progressively compressed by the LP compressor and HP compressor until it reaches the combustion section. Fuel is mixed with the compressed air and burned within the combustion section to provide combustion gases. The combustion gases are routed from the combustion section through the HP turbine and LP turbine. The flow of combustion gasses through the turbine section drives the HP turbine and the LP turbine, each of which in turn drive a respective one of the HP compressor and the LP compressor via the HP shaft and LP shaft. The combustion gases are then routed through the exhaust section, e.g., to atmosphere.

In addition to driving the LP compressor, the LP shaft can additionally drive the fan through a fan gearbox. The gearbox allows the LP shaft to be rotated at a higher speed relative to the fan for greater efficiency. Certain gas turbine engines additionally include an actuation assembly operable with a plurality of fan blades of the fan to change a pitch of each of the plurality of fan blades to further increase an efficiency of the fan.

It can be difficult to package the actuation assembly in the fan due to, e.g., a positioning of one or more bearings that facilitate rotation of the plurality of fan blades. The one or more bearings are positioned inward along a radial direction to minimize a rotational speed to which they are exposed. Accordingly, a fan for a gas turbine engine that allows for packaging of the pitch change mechanism within the fan would be useful.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a gas turbine engine defining a radial direction is provided. The gas turbine engine includes a core turbine engine and a fan mechanically coupled to the core turbine engine. The fan includes a plurality of fan blades, each fan blade defining a base at an inner end along the radial direction. The fan also includes a hub covering the base of each of the plurality of fan blades and defining a hub radius along the radial direction. The fan also includes one or more bearings for supporting rotation of the plurality of fan blades. The one or more bearings define a fan bearing radius along the radial direction. A ratio of the hub radius to the fan bearing radius is less than 1.75.

In another exemplary embodiment of the present disclosure, a gas turbine engine defining a radial direction and an axial direction is provided. The gas turbine engine includes a core turbine engine and a fan mechanically coupled to the turbine engine. The fan includes a plurality of fan blades, each fan blade defining a base at an inner end along the radial direction. The plurality of fan blades are rotatable about the axial direction at a maximum rotational speed during operation of the fan. The fan also includes one or more bearings for supporting rotation of the plurality of fan blades, the one or more bearings defining a DN value during rotation of the plurality of fan blades about the axial direction at the maximum rotational speed of at least about 0.6 million.

In yet another exemplary embodiment of the present disclosure, a gas turbine engine defining a radial direction is provided. The gas turbine engine includes a core turbine engine and a fan mechanically coupled to the core turbine engine. The fan includes a plurality of fan blades, each fan blade defining a base at an inner end along the radial direction. The fan also includes a hub covering the base of each of the plurality of fan blades and defining a hub radius along the radial direction. The fan also includes one or more bearings for supporting rotation of the plurality of fan blades. The one or more bearings define a fan bearing radius along the radial direction. A ratio of the hub radius to the fan bearing radius is less than 2.75. Additionally, the gas turbine engine is configured to generate a maximum takeoff thrust, the maximum takeoff thrust being less than 30,000 pounds.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
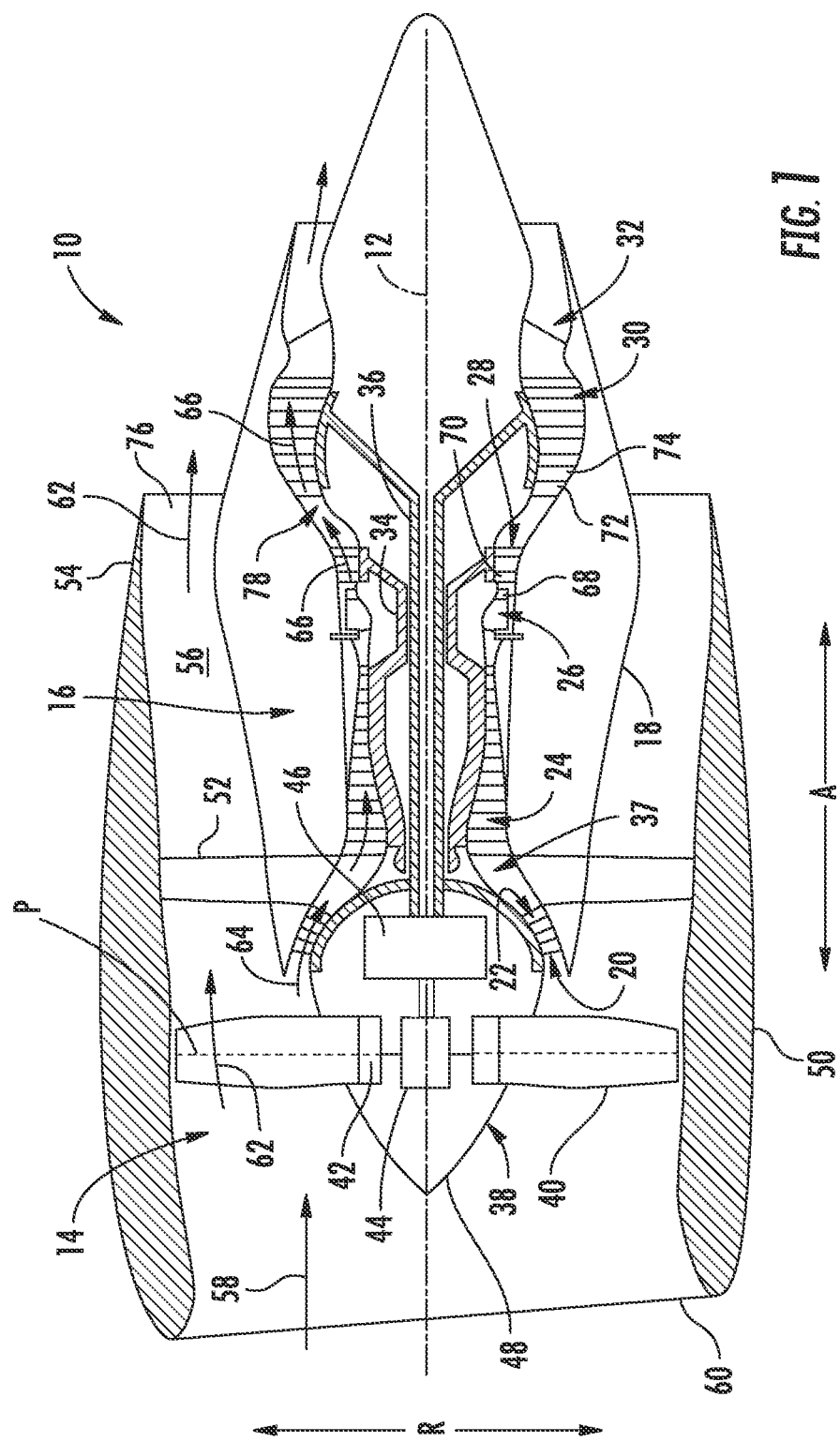
FIG. 1 is a schematic cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The compressor section, combustion section 26, turbine section, and nozzle section 32 together define a core air flowpath 37.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable pitch change mechanism 44 configured to collectively vary the pitch of the fan blades 40 in unison. The fan blades 40, disk 42, and pitch change mechanism 44 are together rotatable about the longitudinal axis 12 by LP shaft 36 across a power gear box 46. The power gear box 46 includes a plurality of gears for adjusting the rotational speed of the fan 38 relative to the LP shaft 36 to a more efficient rotational fan speed.

Referring still to the exemplary embodiment of FIG. 1, the disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the core air flowpath 37, or more specifically into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 10 depicted in FIG. 1 is by way of example only, and that in other exemplary embodiments, the turbofan engine 10 may have any other suitable configuration. It should also be appreciated, that in still other exemplary embodiments, aspects of the present disclosure may be incorporated into any other suitable gas turbine engine. For example, in other exemplary embodiments, aspects of the present disclosure may be incorporated into, e.g., a turboprop engine.

Figure 2:
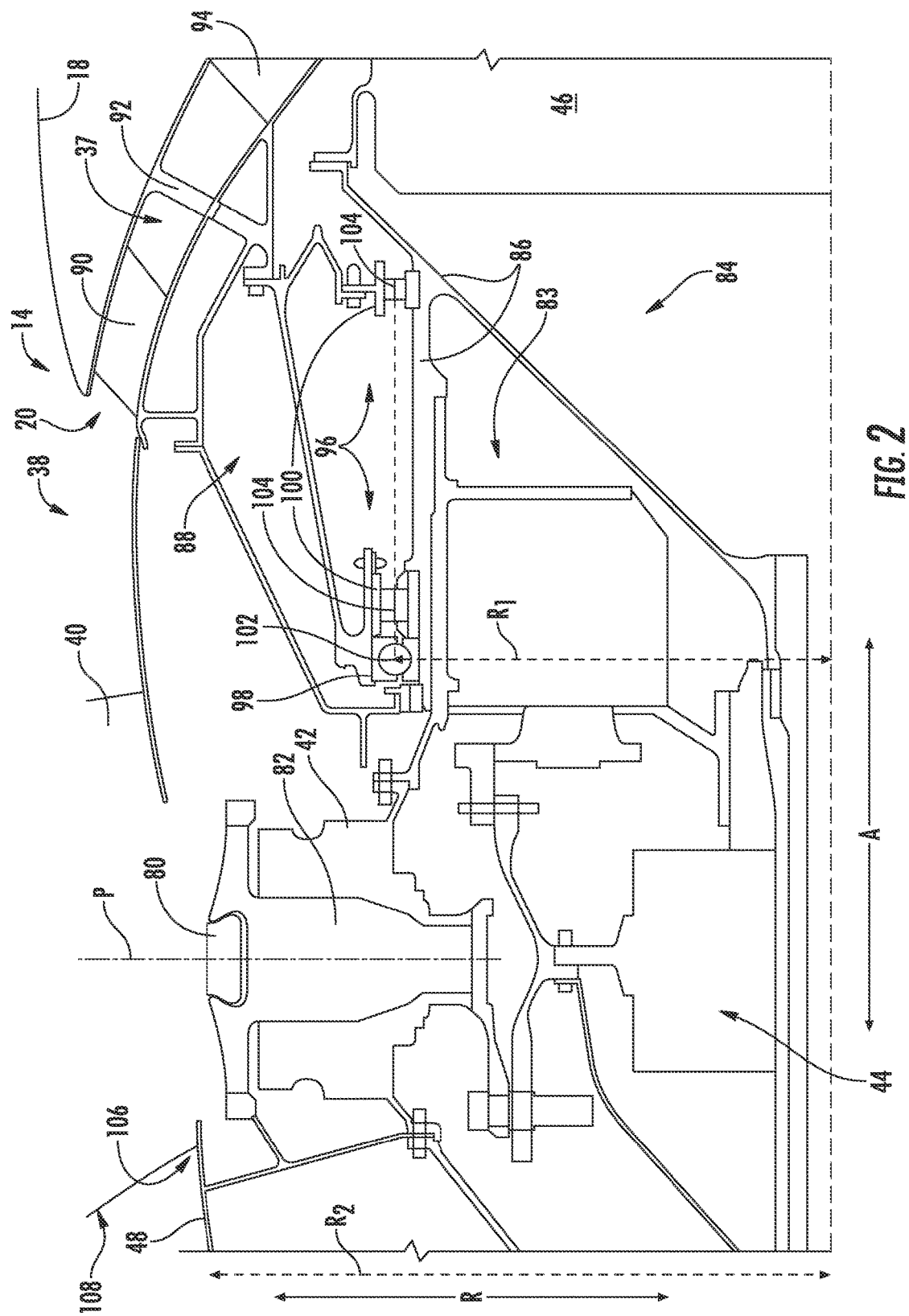
FIG. 2 is a schematic, cross-sectional view of a forward end of a fan of a gas turbine engine in accordance with another exemplary embodiment of the present disclosure.

Referring now to FIG. 2, a schematic, cross-sectional view of a forward end of a turbofan engine 10 in accordance with an exemplary embodiment of the present disclosure is provided. Specifically, FIG. 2 provides a schematic, cross-sectional view of a fan section 14 of the turbofan engine 10. In certain exemplary embodiments, the exemplary turbofan engine 10 of FIG. 2 may be configured in substantially the same manner as exemplary turbofan engine 10 of FIG. 1. Accordingly, the same or similar numbering may refer to the same or similar part.

The exemplary turbofan engine 10 depicted in FIG. 2 is configured as middle range thrust class engine. Specifically, the exemplary turbofan engine 10 is configured to generate a maximum takeoff thrust at standard day conditions (e.g., sea level and 60 degrees Fahrenheit). For example, the turbofan engine 10 may be configured to generate a maximum takeoff thrust at standard day conditions between about 10,000 pounds (lbs.) and about 60,000 lbs. Alternatively, in other exemplary embodiments, the turbofan engine 10 may be configured to generate a maximum takeoff thrust at standard day conditions between about 10,000 lbs. and about 50,000 lbs., such as between about 12,000 lbs. and about 40,000 lbs., such as between about 13,000 lbs. and about 30,000 lbs., such as between about 14,000 lbs. and about 25,000 lbs.

As depicted in FIG. 2, the fan section 14 generally includes a variable pitch fan 38 having a plurality of fan blades 40 coupled to a disk 42. More specifically, each fan blade 40 defines a base 80 at an inner end along a radial direction R. Each fan blade 40 is coupled at the base 80 to the disk 42 via a respective trunnion mechanism 82. For the embodiment depicted, the base 80 is configured as a dovetail received within a correspondingly shaped dovetail slot of the trunnion mechanism 82. However, in other exemplary embodiments, the base 80 may be attached to the trunnion mechanism 82 in any other suitable manner. For example, the base 80 may be attached to the trunnion mechanism 82 using a pinned connection, or any other suitable connection. In still other exemplary embodiments, the base 80 may be formed integrally with the trunnion mechanism 82. Notably, the trunnion mechanism 82 facilitates rotation of a respective fan blade 40 about a pitch axis P of the respective fan blades 40.

Additionally, the exemplary fan 38 of the turbofan engine 10 includes a pitch change mechanism 44 for rotating each of the plurality of fan blades 40 about their respective pitch axes P, e.g., in unison. The pitch change mechanism 44 may generally include one or more rotary actuators, a unison ring, etc. to facilitate rotation of the plurality of fan blades 40 about their respective pitch axes P. moreover, the exemplary fan 38 includes a plurality of counterweights 83 to, e.g., ensure the fan 38 is balanced during operation. It should be appreciated, however, that in other exemplary embodiments, the exemplary fan 38 may include any other suitable configuration/pitch change mechanism 44 for changing the pitch of the plurality of fan blades 40. For example, although the exemplary pitch change mechanism 44 depicted includes one or more rotary actuators, in other exemplary embodiments, the pitch change mechanism 44 may instead include one or more linear actuators, or any other suitable mechanism.

Further, as with the exemplary turbofan engine 10 of FIG. 1, the fan 38 of the exemplary turbofan engine 10 depicted in FIG. 2 is mechanically coupled to the core 16. More particularly, the exemplary variable pitch fan 38 of the turbofan engine 10 of FIG. 2 is rotatable about a longitudinal axis 12 by an LP shaft 36 across a power gearbox 46 (see also the embodiment of FIG. 1). Specifically, the disk 42 is attached to the power gearbox 46 through a fan rotor 84, which includes one or more individual structural members 86 for the embodiment depicted. The power gearbox 46 is, in turn, attached to the LP shaft 36, such that rotation of the LP shaft correspondingly rotates the fan rotor 84 and the plurality of fan blades 40. Notably, as is also depicted, the fan section 14 additionally includes a front hub 48 (which is rotatable with, e.g., the disk 42 and plurality of fan blades 40).

Moreover, the fan 38 additionally includes a stationary fan frame 88. The fan frame 88 is connected through the core air flowpath 37 to the core 16, or more particularly to an outer casing 18 of the core 16. For the embodiment depicted, the core 16 includes a forward vane 90 and a strut 92, each providing structural support between the outer casing 18 of the core 16 and the fan frame 88. Additionally, the LP compressor 22 includes an inlet guide vane 94. The forward vane 90, strut 92, and inlet guide vane 94 may additionally be configured to condition and direct the portion of the flow of air over the fan 38 provided to the core air flowpath 37 to, e.g., increase an efficiency of the compressor section.

Furthermore, the fan 38 includes one or more fan bearings 96 for supporting rotation of the various rotating components of the fan 38, such as the plurality of fan blades 40. More particularly, the fan frame 88 supports the various rotating components of the fan 38 through the one or more fan bearings 96. For the embodiment depicted, the one or more fan bearings 96 includes a forward ball bearing 98 and two roller bearings 100 located aft of the forward ball bearing 98. However, in other exemplary embodiments, any other suitable number and/or type of bearings may be provided for supporting rotation of the plurality of fan blades 40. For example, in other exemplary embodiments, the one or more fan bearings 96 may include a pair (two) tapered roller bearings, or any other suitable bearings. Additionally, in certain exemplary embodiments, the one or more fan bearings 96 may be formed of any suitable material. For example, in at least certain exemplary embodiments, the one or more fan bearings 96 may be formed of a suitable metal material, such as a stainless steel. Alternatively, however, in other exemplary embodiments the one or more fan bearings 96 may include one or more components formed of a suitable ceramic material.

Referring still to FIG. 2, the one or more fan bearings 96 are located aft of the disk 42 and the plurality of trunnion mechanisms 82 and radially outward of at least certain of the various components within the fan 38. More particularly, for the embodiment depicted, the one or more fan bearings 96 are positioned aft of the disk 42 and outward of the pitch change mechanism 44 along the radial direction R and also outward of the one or more fan counterweights 83 along the radial direction R. Accordingly, such configuration allows for the pitch change mechanism 44 to be arranged in-line with the disk 42 and plurality of trunnion mechanisms 82 along the axial direction A and inward of the disk 42 and plurality of trunnion mechanisms 82 along the radial direction R. Moreover, such a configuration allows for the positioning of the one or more fan counterweights 83 adjacent to the pitch change mechanism 44.

Further, for the exemplary embodiment depicted, the one or more fan bearings 96 define a fan bearing radius $R_1$ along the radial direction R. As used herein, the term fan bearing radius $R_1$ refers to a distance along the radial direction R from the longitudinal axis 12 of the turbofan engine 10 to a central axis or center point of the one or more fan bearings 96. More particularly, for the embodiment depicted, each of the forward ball bearing 98 and the pair of roller bearings 100 are aligned such that a center point 102 of the forward ball bearing 98 and central axis 104 of the pair of roller bearings 100 are each positioned at the same distance from the longitudinal axis 12 of the turbofan engine 10. However, in other exemplary embodiments, one or more of the fan bearings 96 may be stepped or otherwise positioned at different distances from the longitudinal axis 12 along the radial direction R. Accordingly, the fan bearing radius $R_1$ may refer to a radius of the innermost bearing along the radial direction R (i.e., a distance of a central axis or center point of the innermost bearing along the radial direction R to the longitudinal axis 12).

Moreover, as is also depicted in FIG. 2, the hub 48 additionally defines a hub radius $R_2$ along the radial direction R. As is indicated, the hub radius $R_2$ refers to a distance of an outermost point of the hub 48 along the radial direction R to the longitudinal axis 12 of the turbofan engine 10. More particularly, for the embodiment depicted, the hub radius $R_2$ refers to a distance along the radial direction R from the longitudinal axis 12 of the turbofan engine 10 to an innermost point 106 of a leading edge 108 of the fan blades 40.

As stated, the one or more fan bearings 96 of the fan 38 are generally positioned at an outward location along the radial direction R as compared to prior configurations. Additionally, the hub radius $R_2$ is indicative of an overall size of a core portion of the fan 38. Accordingly, the fan 38 of the turbofan engine 10 depicted defines a hub radius to fan bearing radius ratio $R_2:R_1$ (i.e., a ratio of the hub radius $R_2$ to the fan bearing radius $R_1$) of less than or equal to about 2.75, such as less than or equal to about 2.5, such as less than or equal to about 2, such as less than or equal to about 1.75. More particularly, for the embodiment depicted, the hub radius to fan bearing radius ratio $R_2:R_1$ is greater than or equal to about one (1) and less than or equal to about 1.5. It should be appreciated, that as used herein, terms of approximation, such as "about" or "approximately," refer to being within a ten percent margin of error.

Notably, the plurality of fan blades 40 are rotatable about the axial direction A at a maximum rotational speed during operation of the fan 38 of the turbofan engine 10. The maximum rotational speed refers to a maximum speed at which the fan blades 40 are configured to rotate during a full power condition of the turbofan engine 10, such as when the turbofan engine 10 is generating a maximum takeoff thrust. With one or more of the above embodiments, the one or more fan bearings 96 supporting rotation of the plurality of fan blades 40 may define a DN value during operation of the fan 38 and rotation of the plurality of fan blades 40 at the maximum rotational speed of at least about 0.6 million. For example, in certain exemplary embodiments, the one or more fan bearings 96 supporting rotation of the plurality of fan blades 40 may define a DN value during rotation of the plurality of fan blades 40 of at least about 0.7 million, at least about 0.8 million, at least about 1 million, or at least about 1.5 million. As used herein, the term "DN value" refers to a fan 38 bearing speed quantifier calculated by multiplying a bore of the bearing in millimeters by a rotational speed in revolutions per minute (RPM). The bore of the one or more fan bearings 96 supporting rotation of the plurality of fan blades 40 of the fan 38 refers to a distance from the longitudinal axis 12 of the turbofan engine 10 to an inner race of the one or more fan bearings 96.

Accordingly, in order to maintain the DN value of the one or more fan bearings 96 supporting rotation of the plurality of fan blades 40 below one or more of the above stated DN values, the fan 38 may define a relatively low maximum rotational speed during operation. For example, in certain exemplary embodiments, the fan 38 may define a maximum rotational speed of less than about 8,500 RPM during operation. More specifically, in certain exemplary embodiments, the fan 38 may define a maximum rotational speed of less than about 8,000 RPM during operation, less than about 7,500 rpm during operation, less than about 7,000 RPM during operation, less than about 6,500 rpm during operation, or less than about 6,000 RPM during operation.

As discussed above, inclusion of a relatively high fan bearing radius relative to a fan hub radius may allow for a desired packaging of, e.g., a pitch change mechanism and one or more fan counterweights in a fan of a turbofan engine. Moreover, wherein the turbofan engine as a geared turbofan engine (i.e., including a gearbox connecting a driveshaft and a fan shaft while reducing a rotational speed of the fan shaft relative to the driveshaft) the increased fan bearing radius may additionally provide for a more stable fan during operation. Specifically, with non-geared turbofan engines, a forward thrust load generated by the fan during operation may be counteracted by a reverse thrust load generated by a turbine section of the turbofan engine (the turbine section being directly connected to the fan via a shaft in such a configuration). By contrast, within a geared turbofan engine, such as the exemplary geared turbofan engine depicted in FIG. 2, the forward ball bearing is required to carry substantially all of an amount of forward thrust generated by the fan during operation, as the power gearbox prevents the LP shaft from offsetting such forward thrust load of the fan with a reverse thrust load of the turbine section. Accordingly, the increased fan bearing radius allows the one or more fan bearings to carry the forward thrust load while minimizing, e.g., any moments on such one or more fan bearings in the event of a variation in a distribution of the forward thrust load on the one or more fan bearings.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine defining a radial direction and a longitudinal axis, the gas turbine engine comprising:
   a core turbine engine; and
   a fan mechanically coupled to the core turbine engine, the fan comprising
      a plurality of fan blades, each fan blade defining a base at an inner end along the radial direction;
      a hub configured to direct an airflow through the plurality of fan blades and covering the base of each of the plurality of fan blades, the hub defining a hub radius along the radial direction between the longitudinal axis and an outermost point of the hub along the radial direction; and
      one or more bearings for supporting rotation of the plurality of fan blades about the longitudinal axis, the one or more bearings including a ball bearing defining a fan bearing radius along the radial direction, a ratio of the hub radius to the fan bearing radius being less than 1.75; and
   a power gearbox, wherein the fan is driven by the core turbine engine through the power gearbox.

2. The gas turbine engine of claim 1, wherein the ratio of the hub radius to the fan bearing radius is greater than or equal to one and less than or equal to about 1.5.

3. The gas turbine engine of claim 1, wherein the gas turbine engine is configured to generate a maximum takeoff thrust, and wherein the maximum takeoff thrust is greater than 10,000 pounds and less than 60,000 pounds.

4. The gas turbine engine of claim 1, wherein the one or more bearings include two roller bearings and the ball bearing.

5. The gas turbine engine of claim 1, wherein the fan further comprises a pitch change mechanism for changing a pitch of each of the plurality of fan blades, and wherein the one or more bearings are located outward from the pitch change mechanism along the radial direction.

6. The gas turbine engine of claim 1, wherein the fan further comprises one or more fan counterweights, and wherein the one or more bearings are located outward from the one or more fan counterweights along the radial direction.

7. The gas turbine engine of claim 1, wherein the one or more bearings include a plurality of bearings, and wherein the fan bearing radius is a radius of the innermost bearing along the radial direction.

8. The gas turbine engine of claim 1, wherein the fan bearing radius along the radial direction is a distance from the longitudinal centerline of the gas turbine engine to a central axis or center point of the ball bearing of the one or more bearings.

9. The gas turbine engine of claim 1, wherein the plurality of fan blades are rotatable about an axial direction at a maximum rotational speed during operation of the fan, and wherein the one or more bearings define a DN value during rotation of the plurality of fan blades at the maximum rotational speed of at least 0.54 million and up to 1.65 million.

10. The gas turbine engine of claim 1, wherein the plurality of fan blades are rotatable about an axial direction at a maximum rotational speed during operation of the fan, and wherein the one or more bearings define a DN value during rotation of the plurality of fan blades at the maximum rotational speed of at least 0.72 million and up to 1.65 million.

11. A gas turbine engine defining a radial direction and an axial direction, the gas turbine engine comprising:
   a core turbine engine; and
   a fan mechanically coupled to the core turbine engine, the fan comprising
      a plurality of fan blades, each fan blade defining a base at an inner end along the radial direction, the plurality of fan blades rotatable about the axial direction at a maximum rotational speed of less than 9,350 revolutions per minute (RPM) during operation of the fan;
      a hub configured to direct an airflow through the plurality of fan blades and covering the base of each of the plurality of fan blades, wherein the hub defines a hub radius along the radial direction between a longitudinal axis and an outermost point of the hub along the radial direction; and
      one or more bearings for supporting rotation of the plurality of fan blades about the longitudinal axis, the one or more bearings defining a DN value during rotation of the plurality of fan blades about the axial direction at the maximum rotational speed of at least 0.54 million and up to 1.65 million, and the one or more bearings including a ball bearing defining a fan bearing radius along the radial direction, a ratio of the hub radius to the fan bearing radius being less than 1.75; and
   a power gearbox, wherein the fan is driven by the core turbine engine through the Power gearbox.

12. The gas turbine engine of claim 11, wherein the one or more bearings define a DN value during operation of the fan at the maximum rotational speed of at least 0.72 million and up to 1.65 million.

13. The gas turbine engine of claim 11, wherein the fan further comprises a pitch change mechanism for changing a pitch of each of the plurality of fan blades, and wherein the one or more bearings are located outward from the pitch change mechanism along the radial direction.

14. The gas turbine engine of claim 11, wherein the one or more bearings include a plurality of bearings, and wherein the fan bearing radius is a radius of the innermost bearing along the radial direction.

15. A gas turbine engine defining a radial direction and a longitudinal axis, the gas turbine engine comprising:
   a core turbine engine; and
   a fan mechanically coupled to the core turbine engine, the fan comprising
      a plurality of fan blades, each fan blade defining a base at an inner end along the radial direction;
      a hub configured to direct an airflow through the plurality of fan blades and covering the base of each of the plurality of fan blades, the hub defining a hub radius along the radial direction between the longitudinal axis and an outermost point of the hub along the radial direction; and
      one or more bearings for supporting rotation of the plurality of fan blades about the longitudinal axis, the one or more bearings including a ball bearing defining a fan bearing radius along the radial direction, a ratio of the hub radius to the fan bearing radius being less than 1.75; and
   a power gearbox, wherein the fan is driven by the core turbine engine through the power gearbox,
   wherein the gas turbine engine is configured to generate a maximum takeoff thrust, and wherein the maximum takeoff thrust is greater than 10,000 pounds and less than 30,000 pounds.

16. The gas turbine engine of claim 15, wherein the ratio of the hub radius to the fan bearing radius is greater than or equal to one and less than or equal to about 1.5, and wherein the maximum takeoff thrust is greater than 12,600 pounds and less than 27,500 pounds.

* * * * *